United States Patent [19]

Terashima et al.

[11] Patent Number: 5,274,617
[45] Date of Patent: Dec. 28, 1993

[54] METHOD AND DEVICE FOR DATA MANAGEMENT IN AN OPTICAL RECORDING MEDIUM

[75] Inventors: Shigeo Terashima, Tenri; Toshihisa Deguchi; Kunio Kojima, both of Nara; Shigema Maeda, Yamatokoriyama, all of Japan

[73] Assignee: Sharp Kabushiki Kaisha, Osaka, Japan

[21] Appl. No.: 528,370

[22] Filed: May 25, 1990

[30] Foreign Application Priority Data

May 26, 1989 [JP] Japan .................................. 1-134064
May 30, 1989 [JP] Japan .................................. 1-136784

[51] Int. Cl.$^5$ .......................... G11B 15/04; G11B 7/00
[52] U.S. Cl. ................................. 369/54; 369/32; 369/56; 369/58; 369/30; 360/72.2; 360/57; 360/2
[58] Field of Search ................ 369/54, 32, 30, 48, 369/50, 56, 58, 53; 360/72.1, 72.2, 2, 8, 57

[56] References Cited

U.S. PATENT DOCUMENTS

| 4,800,258 | 1/1989 | Suzuki et al. .............. 360/2 |
| 4,839,749 | 6/1989 | Franklin .................... 369/69 |
| 4,862,439 | 8/1989 | Ando et al. ................. 369/32 |
| 4,907,216 | 3/1990 | Rijnsburger . | |
| 4,932,016 | 6/1990 | Yoshida et al. .............. 369/48 |
| 4,954,841 | 9/1990 | Ichihara et al. ............. 369/275.1 |
| 5,012,461 | 4/1991 | Yoshida et al. .............. 369/32 |
| 5,038,231 | 8/1991 | Harigaya et al. ............. 360/69 |
| 5,058,096 | 10/1991 | Ando et al. ................. 369/53 |

FOREIGN PATENT DOCUMENTS

| 0292917 | 5/1988 | European Pat. Off. . |
| 0275972 | 7/1988 | European Pat. Off. . |
| 0277655 | 8/1988 | European Pat. Off. . |
| 64-39632 | 2/1989 | Japan . |

OTHER PUBLICATIONS

"Zukai Compact Disk Dokuhon (Illustrative Compact Disk Handbook)" second edition, Apr. 25, 1988.
The English Abstract of Japanese No. 63-222379; Sony Corp. The Art of Digital Audio; John Watkinson; Jan. 1988; pp. 1 and 441 to 487.

*Primary Examiner*—Tommy Chin
*Assistant Examiner*—Khoi Truong

[57] ABSTRACT

A recording and reproducing device, which records and reproduces information on and from a rewritable recording medium having absolute addresses and including an information recording area wherein information entered from external devices is recorded and a Table of Contents area wherein additional address information with respect to the information recorded in the information recording area is recorded. The TOC area contains the absolute addresses of the recording positions of each information recorded in the information recording area. A display section graphically and independently displays the recorded and unrecorded ranges of the information recording area according to the absolute addresses recorded in the TOC area with respect to the recording positions of each piece of information. A warning device alerts the user that a position on the disc is occupied by referring TOC area when it is instructed to record new information in the position of the information recording area where another information has already been recorded.

21 Claims, 4 Drawing Sheets

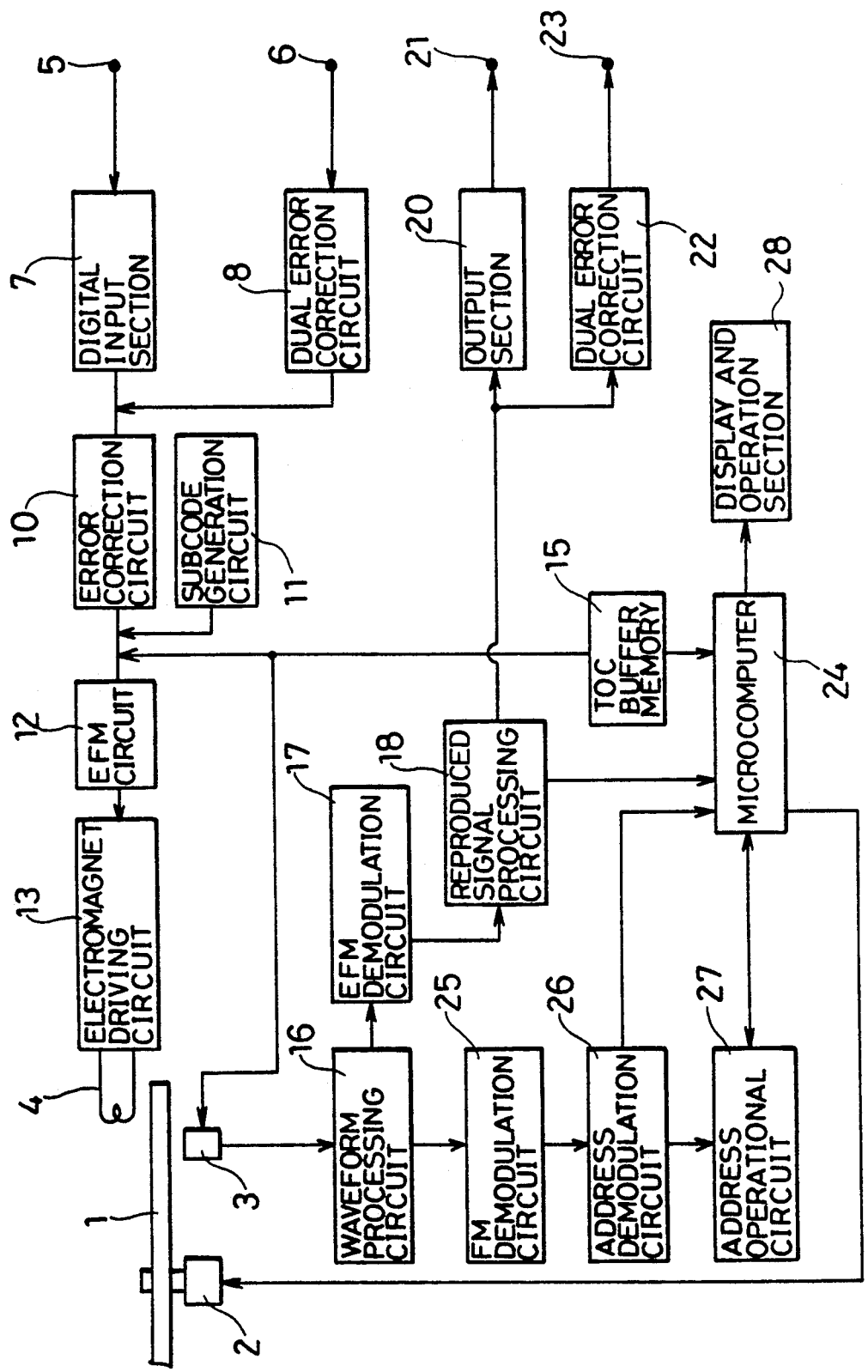

METHOD AND DEVICE FOR DATA MANAGEMENT IN AN OPTICAL RECORDING MEDIUM

FIELD OF THE INVENTION

The present invention relates to a recording and reproducing device for recording and reproducing various kinds of information on and from a rewritable recording medium which comprises absolute addresses.

BACKGROUND OF THE INVENTION

Conventionally, compact disks are widely used, wherein music information or other information is recorded as digital signals by the use of pits mechanically formed thereon. These compact disks are designed to be used only for reproducing information.

On the compact disks, there are pieces of information successively recorded, and in reproducing the information, a successive reproduction, selective reproduction, or other forms of reproduction is performed while collating absolute addresses predeterminately recorded on the disk with those recorded in the TOC (Table of Contents) area of the disk for indicating the recording position of each piece of information.

In the case of rewritable disks such as magneto-optical disks, which have been developed recently for recording music information or other information thereon, it is desirable to provide a disk recording and reproducing device which can interchangeably use the rewritable disks and conventional compact disks by using common reproducing methods.

Therefore, likewise in the compact disk, it is proposed to install a TOC area in the rewritable disk in order to record absolute addresses indicating the recording start positions and recording end positions therein and to use the absolute addresses recorded in the TOC area in reproducing each piece of information.

More specifically, when the rewritable disk is placed in the disk recording and reproducing device, by reading the absolute addresses recorded in the TOC area and storing them in the buffer section of a microcomputer, an access to the leading part of desired information may be performed at once in reproduction, and in recording new information, the absolute addresses of the information indicating the recording start position and recording end position thereof are stored in the buffer section. Moreover, when the rewritable disk is removed from the disk recording and reproducing device, the contents of the buffer section are recorded in the TOC area for use in the next reproduction.

Furthermore, in the disk recording and reproducing device having above arrangement for the rewritable disks, it is proposed to display the absolute addresses indicating the recording start position and recording end position of each information on a display part in order to confirm the recorded information.

However, in a disk recording and reproducing device with the above arrangement, if the memory in the buffer section should be lost due to a power cut-off or other malfunction during recording on the rewritable disk or reproducing therefrom, nonconformity might occur between the absolute addresses recorded in the TOC area and the actual recorded positions of the information, and thereafter it would be impossible for the user to accurately recognize the contents of an information recording area wherein information entered from external devices is recorded. As a result, inconvenience might be presented in that information is mistakenly recorded overlapping with the position where necessary information has been recorded.

Moreover, in the rewritable disk, a plurality of information tends to remain on the disk in an unsuccessive state due to such operations wherein a part of information previously recorded has to be erased. In this case, when finding space domains in which to record new information, since the user has to determine the position and length of the space domains according to the absolute addresses of the information previously recorded shown on the display part, the determination tends to be complicated, and consequently, if the user should make a mistake in determining the length or other factors of the space domains, he might erase information previously recorded while recording the new information.

Furthermore, research on an overwriting function for magneto-optical disks or the like for overwriting new information on the range previously recorded has been performed with the arrangement, if overwriting should be mistakenly performed on a range with necessary recorded information, the information would be erased, and whereby a troublesome situation might be caused. Moreover, if a part of or all of the information previously recorded should be erased by overwriting or erasing operation, nonconformity would occur between the contents of the TOC area and the actual position of the recorded information, thereby causing confusion in next accusing the information.

SUMMARY OF THE INVENTION

It is a general object of the present invention to provide a recording and reproducing device wherein a warning can be given to show that the position has already been occupied when attempting to record new information on a position in the information recording area of a recording medium where a previous information has already been recorded.

It is another object of the present invention to provide a recording and reproducing device capable of preventing the inconvenience that occurs should necessary information be mistakenly erased by recording new information.

It is still another object of the present invention to provide a recording and reproducing device capable of eliminating nonconformity between the contents of a TOC area in a recording medium and the actual position of the recorded information in an information recording area therein.

It is a further object of the present invention to provide a recording and reproducing device capable of eliminating the trouble in evaluating the utility of remaining information parts in a recording medium for the user.

It is a still further object of the present invention to provide a recording and reproducing device wherein even if additional information recorded is lost due to a power failure or other malfunction, in the recording operation thereafter, the user is able to accurately recognize the recording conditions of an information recording area in a recording medium, and avoid recording another information overlapping with already recorded information.

It is another object of the present invention to provide a recording and reproducing device wherein in recording new information on a recording medium, the user is able to recognize space domains of an information recording area easily and accurately.

In order to achieve the above objects, a recording and reproducing device of the present invention, which records and reproduces information on and from a rewritable recording medium having absolute addresses and comprising an information recording area wherein information entered from external devices is recorded and a TOC area wherein additional information with respect to the information recorded in the information recording area is recorded, is characterized in comprising: recording device for recording information in the information recording area and for recording the absolute addresses indicating at least the recording positions of information in the TOC area as additional information every time the information is recorded in the information recording area; a display for graphically displaying the recorded ranges and unrecorded ranges of the information recording area independently according to the absolute addresses recorded in the TOC area indicating the recording positions of each piece of information; a warning device for issuing a warning to show that a position has already been occupied by referring to the additional information recorded in the TOC area if it is instructed to record new information in the position of the information recording area where information has already been recorded; first editing device for erasing the additional information in the TOC area with respect to any information within the information recording area when it is completely erased therefrom; and second editing device for detecting a remaining amount of any information when the information is partially erased from the information recording area, for recording in the TOC area absolute addresses indicating the recording positions of the remaining information part after replacing the absolute addresses indicating the recording positions of its original information with those indicating the recording positions of the remaining information part by judging the remaining information part as one piece of information when the remaining amount is not less than a predetermined value, and for erasing the additional information of the partially erased information from the TOC area when the remaining amount of the partially erased information is less than the predetermined value.

With the above arrangement, since a warning is given when the system is instructed to record new information in a position of the information recording area of the rewritable recording medium, where information has already been recorded, by evaluating the utility of the information which has been recorded in the position, the user is able to stop recording in the position after he judges if it is of utility value, and to instruct the system to overwrite new information therein if he judges it is not. As a result, the system avoids the inconvenience that necessary information might be mistakenly erased by overwriting new information.

Moreover, in the case where information previously recorded in the information recording area of the rewritable recording medium is completely erased by overwriting or erasing operation, since additional information with respect to information within the TOC area of the recording medium is also erased by the first editing means, nonconformity between the contents of the TOC area and the actual contents of the information recording area is eliminated.

Furthermore, in the case where information within the information recording area of the rewritable recording medium is partially erased, judgement is given by the second editing means with respect to the utility value of the partially remaining information based on the remaining amount. When the remaining part of the information is comparatively long and is judged useful, the absolute addresses indicating the recording positions of the remaining part are replaced with the absolute addresses indicating the recording positions of its original information and then recorded in the TOC area. On the other hand, when the remaining part is short and is judged not useful, additional information with respect to the information is erased. Therefore, the arrangement permits the user to spare the trouble in evaluating the utility of the remaining information part one by one, and conformity between the contents of the TOC area and the contents of the information recording area is properly maintained.

Moreover, every time information is recorded in the information recording area of the rewritable recording medium, its additional information including at least the absolute addresses indicating the recording positions of the information is recorded in the TOC area, and therefore even if additional information stored in the buffer section of the recording and reproducing device has been lost due to the cut-off of the power source or other malfunctions, additional information corresponding to the newest recording conditions of the recorded information is always stored in the TOC area. Consequently, in the recording operation thereafter, the user is able to accurately recognize the recording conditions of the information recording area in the recording medium, and such trouble as to record another information overlapping with information already recorded is perfectly prevented.

Furthermore, since the using conditions of the information recording area are displayed on the display means according to the absolute addresses recorded in the TOC area, that is, the recorded range and unrecorded range thereof, are graphically displayed thereon, in recording new information on the recording medium, the user is able to recognize space domains easily and accurately.

For a fuller understanding of the nature and advantages of the invention, reference should be made to the ensuing detailed description taken in conjunction with the accompanying drawings.

BRIEF DESCRIPTION OF THE DRAWINGS

FIGS. 1 to 6 show one embodiment of the present invention.

FIG. 2 is a block diagram showing a disk recording and reproducing device.

FIG. 3 is an explanatory diagram showing the cases wherein new information is recorded under the various using conditions of information recording area.

FIG. 4 is a schematic plan view of a magneto-optical disk.

FIG. 5 is an enlarged partial plan view of the magneto-optical disk.

FIG. 6 is an explanatory diagram showing an example of the use of an information recording area.

DETAILED DESCRIPTION OF THE EMBODIMENTS

Figure 1A:
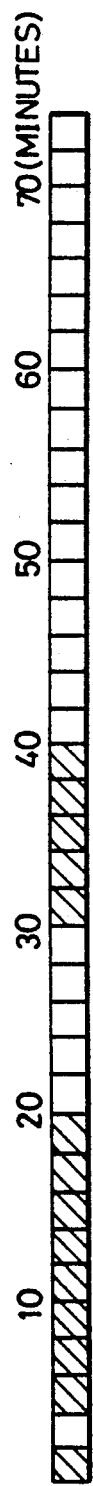
FIGS. 1(a) and 1(b) are explanatory diagrams respectively showing examples of using conditions of information recording area graphically displayed.

The following description will discuss one embodiment of the present invention referring to FIGS. 1 to 6.

As shown in FIG. 2, a disk recording and reproducing device include a spindle motor 2 for supporting and rotating a magneto-optical disk 1 as a rewritable recording medium, an optical head 3 for applying a laser beam on the magneto-optical disk 1 and for reproducing information according to a reflecting light from the magneto-optical disk I and an electromagnet 4 for applying a magnetic field to the magneto-optical disk 1. The electromagnet 4 makes it possible to overwrite new information on an area where information has already been recorded. Moreover, the optical head 3 as well as the electromagnet 4 functions as recording mechanism.

The disk recording and reproducing device also included a first input terminal 5 and a second input terminal 6. Through the first input terminal 5, is entered analog information from magnetic tapes etc. or digital information from compact disks etc. On the other hand, through the second input terminal 6, is entered digital information for use in computers or similar apparatus.

The analog information entered through the first input terminal 5 is converted into digital information by being sampled by the use of a sampling frequency, 44.1 kHz compact disks at a digital input section 7, and then is sent to an error correction circuit 10.

on the other hand, the digital information entered through the first input terminal 5 is sent to the error correction circuit 10, without any treatment, through the digital input section 7. Moreover, the digital information entered through the second input terminal 6 is sent to the error correction circuit 10 through a dual error correction circuit 8.

To the information, which has been given error correction processing, if necessary, at the error correction circuit 10, are added subcodes generated at a subcode generation circuit 11, and then sent to an electromagnet driving circuit 13 after being given EFM processing at an EFM (Eight Fourteen Modulation) circuit 12.

The electromagnet 4 is driven by the electromagnet driving circuit 13 according to the information modulated at the EFM circuit 12, and at the same time, a laser beam is applied to the magneto-optical disk 1 by the optical head 3, thereby recording the information in an information recording area 1b (see FIG. 4) of the magneto-optical disk 1.

In the present embodiment, each time information is recorded in the information recording area 1b, additional information including absolute addresses indicating the recording start position and recording end position of the information is recorded in a TOC area 1a (shown in hatching in FIG. 4 for convenience), immediately after it is stored in a buffer memory 15 for the TOC area which will be described later. In this case, the additional information stored in the buffer memory 15 is sent to the EFM circuit 12, where EFM processing is applied to the information, and then is recorded by the electromagnet 4 while applying the laser beam from the optical head 3 in the same process as was aforementioned.

With the arrangement of the present invention, since the additional information is recorded in the TOC area 1a each time information is recorded in the information recording area 1b, even in the case where the contents of the buffer memory 15 have been lost during the recording or reproducing operation due to a power cut-off or other malfunction, the newest recorded contents of the information recording area 1b remain stored in the TOC area 1a. Accordingly, in the recording or reproducing operation thereafter, the user is able to accurately recognize the recording conditions of the information stored in the information recording area 1b. Therefore, the system prevents the problem of erasing previously recorded information while recording new information.

Figure 5:
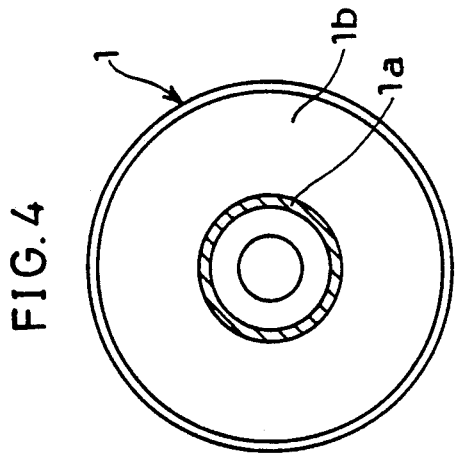

As shown in FIG. 5, on the magneto-optical disk 1, there are predeterminately formed guiding grooves 14 (shown in hatching for convenience) having a spiral form or a concentric circular form, extending in a circumference direction, and wobbling is given to the guiding grooves 14 in a radial direction of the disk. More specifically, FM (Frequency Modulation) processing, which modulates the frequency of a carrier wave having a constant amplitude by absolute address information, is applied to the absolute addresses of each part on the magneto-optical disk 1, and the guiding grooves 14 are wobbling having pitches formed in response to the modulated frequencies.

As shown in FIG. 2, the recording and reproducing device of the present invention includes the TOC buffer memory 15. As aforementioned, the TOC buffer memory 15 is designed so that the contents of the TOC area 1a are read therefrom and are stored therein at the time when the magneto-optical disk 1 is placed in the disk recording and reproducing device.

By applying the laser beam to the magneto-optical disk 1, the optical head 3 is designed to reproduce the information stored in the information recording area 1b, the additional information stored in the TOC area 1a and the absolute addresses expressed by the wobbling of the guiding grooves 14.

A waveform processing circuit 16 is connected to the optical head 3 for performing waveform processing as required for applying the information or additional information reproduced by the optical head 3.

To the information or additional information after the application of waveform processing, is applied EFM demodulation by an EFM demodulation circuit 17, wherein signals after the application of EFM processing are demodulated, and is performed necessary processing by a reproduced signal processing circuit 18. Then, the information recorded in the information recording area 1b is released as digital information, as it is, through a output section 20 and a first output terminal 21, or it is released from the first output terminal 21 after being converted into analog information at the output section 20, if necessary. Furthermore, if the information is for computers or the like, it is released as digital information through a second output terminal 23 after necessary error correction is performed thereto at a dual error correction circuit 22.

On the other hand, the additional information, to which necessary processing has been applied at the reproduced signal processing circuit 18, is stored in the TOC buffer memory 15 through a microcomputer 24, as was aforementioned.

To the absolute addresses, to which waveform processing has been applied at the waveform processing circuit 16, is applied FM demodulation at an FM demodulation circuit 25, where their frequencies are converted into amplitudes. Successively, address demodulation is performed at an address demodulation circuit 26, and whereby the values of the absolute addresses are obtained from the amplitudes. The values of the absolute addresses are, first to the microcomputer 24 and second to an address operational circuit 27.

The microcomputer 24 adjusts the rotational speed of the spindle motor 2, and is designed to perform rotation control for the magneto-optical disk 1, for example, by CLV (Constant Linear Velocity) control in recording or reproducing information as its basic function. Moreover, in the magneto-optical disk 1, information recording is basically performed by using a sampling frequency for compact disks, 44.1 kHz. However, in recording or reproducing digital information formed of another sampling frequency different from that for compact disks, the microcomputer 24 changes rotation speed of the spindle motor 2 according to the sampling frequency, thereby controlling recording density of the information to be substantially constant regardless of the sampling frequency.

Further, when changing the rotation speed of the spindle motor 2 to a different speed from that used for compact disks according to the sampling frequency of information to be recorded, the absolute addresses predeterminately recorded in the magneto-optical disk 1 do not conform to the elapsed time from the standard starting time of the recording or reproduction. In that case, the absolute addresses are converted at the address operational circuit 27 according to the rotation speed of the magneto-optical disk 1, and the compensated absolute addresses are found, which conform to the elapsed time from the predetermined standard starting time of the recording or reproduction. Then, the compensated absolute addresses are sent to the microcomputer 24. At a display and operation section 28 having a display section, the elapsed time since the start of reproduction or other factors is displayed according to the compensated absolute addresses. Moreover, through the display and operation section 28, instructions for recording, reproducing or other instructions are performed by the user.

Figure 6:
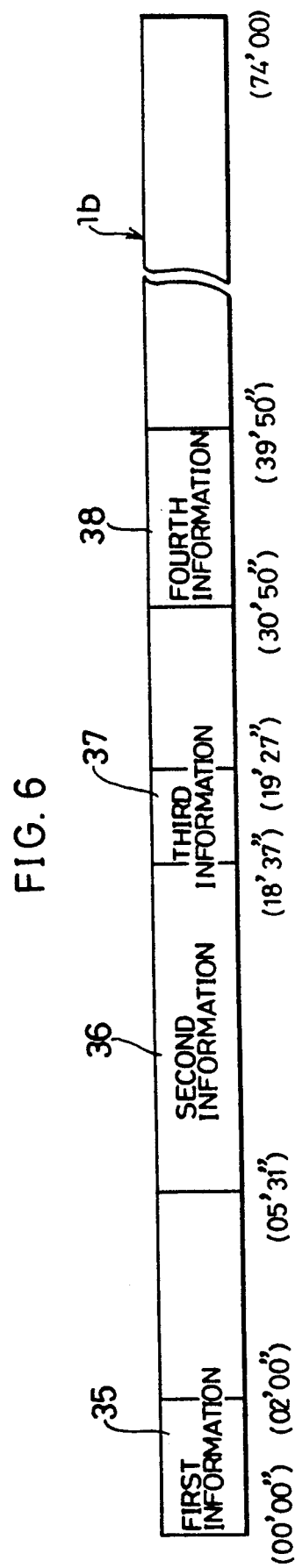

On the display and operation section 28, the using conditions of the information recording area 1b, that is, the recorded ranges and unrecorded ranges are separately displayed. Now it is assumed that four pieces of information, from first to fourth information 35 to 38, are unsuccessively recorded in the information recording area 1b, as shown in FIG. 6. In that case, the converted values of the absolute addresses by time with respect to the recording start position and recording end position of each information 35 to 38 are expressed as numerical values shown in Table 1.

TABLE 1

| 1st Information | 00'00"–02'00" |
| 2nd Information | 05'31"–18'37" |
| 3rd Information | 18'37"–19'27" |
| 4th Information | 30'50"–39'50" |

However, it is not easy for the user to recognize the space domains from the display showing the numerical values of the recorded ranges of the information recording area 1b.

Therefore, with the arrangement of the present embodiment, the use of the information recording area 1b is shown by a graphical display on the display and operation section 28.

In that case, for example, as shown in FIG. 1(a), the recorded ranges and unrecorded ranges of the information recording area 1b can be separately displayed using bars with different contrasts, colors or the like. In addition, in FIG. 1(a), recorded ranges lasting less than two minutes are counted as two.

Figure 1B:
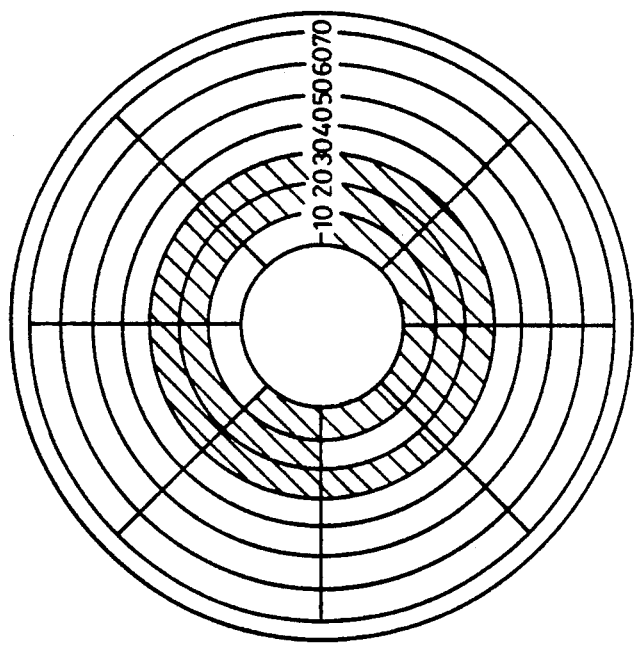

Moreover, as shown in FIG. 1(b), a disc shaped display modelled after the magneto-optical disk 1 can be disposed on the display and operation section 28, and the recorded ranges and unrecorded ranges of the information recording area 1b can be collectively displayed on the disc with different contrasts, colors or the like. The recording conditions of the information recording area 1b shown in FIG. 1(b) are different from those shown in FIG. 6.

As aforementioned, by displaying the recorded ranges and unrecorded ranges of the information recording area 1b graphically, the user is able to recognize the rewritable domains of the information recording area 1b easily. In addition, various ways of graphically displaying the information recording area 1b adoptable other than those aforementioned.

The microcomputer 24 function as first and second editing devices which edit the contents of the TOC area 1a according to changes in the recording contents of the information recording area 1b when completing such operations as overwriting new information or as erasing previously recorded information in the information recording area 1b. Moreover, although it is not shown in the figures, the disk recording and reproducing device of the present invention includes a warning device which, upon being instructed to record new information, refers to the additional information in the TOC area 1a, and warns the fact that a position has already been occupied by information already recorded therein. The system warns the operator by voice, warning sound, predetermined display or other method. To FIG. 3, the following description details editing additional information stored in the TOC area 1a which is performed in response to recording information to the information recording area 1b.

Figure 3:
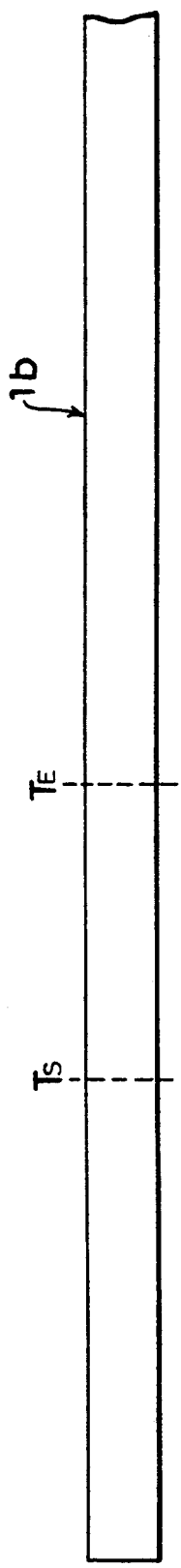
Figure 3:
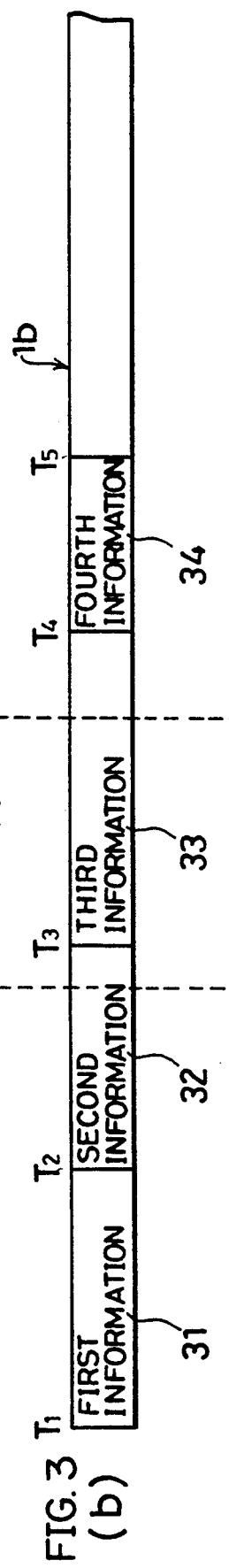
Figure 3:
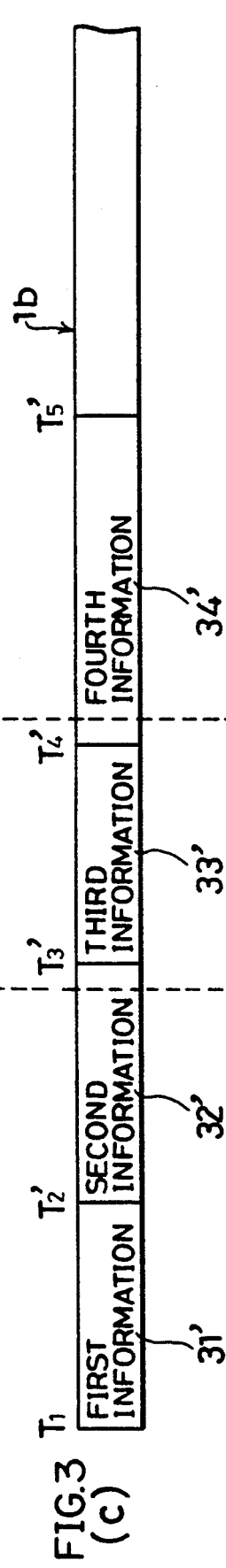
Figure 3:
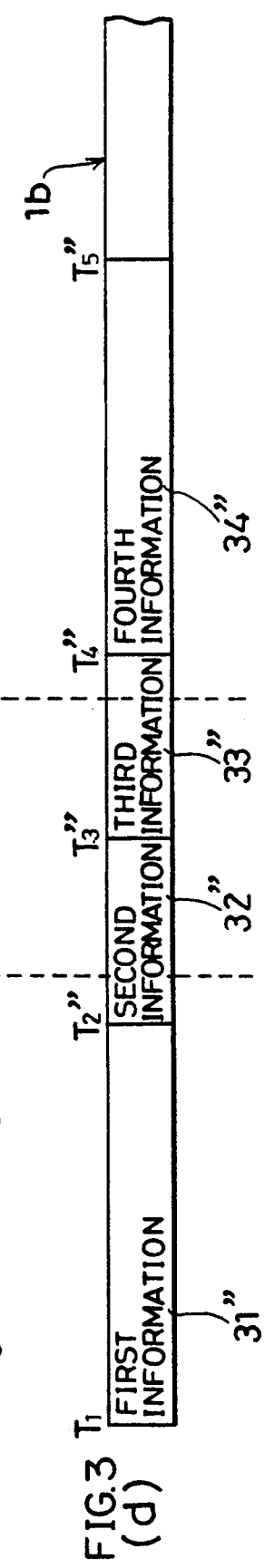
Figure 4:
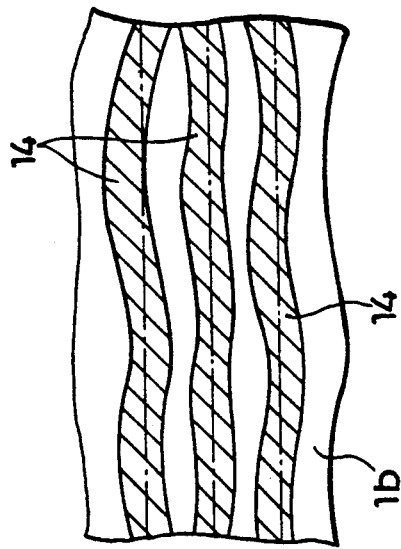

Under the condition (a) in FIG. 3, the information recording area 1b has not been used yet. Under this condition, any position of the information recording area 1b is available to record new information. Further, no additional information has been recorded in the TOC area 1a under the conditions.

In the condition shown by (a) in FIG. 3, for example, it is assumed that new information 30 is recorded in a range having absolute addresses between $T_S$ and $T_E$ in the information recording area 1b. Upon recording the new information 30, in the TOC area 1a, are recorded the absolute addresses $T_S$ indicating the recording start position of the new information 30 and $T_E$ indicating the recording end position thereof as its additional information. Moreover, if necessary, the sampling frequency and the like of the new information 30 are also recorded in the TOC area 1a as the additional information.

In the using conditions shown by (b) to (d) in FIG. 3, a first to a fourth information 31 to 34, a first to a fourth information 31' to 34', and a first to a fourth information 31" to 34", each of which has a length different from one another, are recorded in the information recording area 1b. Therefore, in the TOC area 1a, are recorded absolute addresses indicating at least the recording start position and recording end position of each information, 31 to 34, 31' to 34', 31" to 34" as its additional information, according to respective using conditions.

Next, in the using condition shown by (b) in FIG. 3, in the case where new information 30 having an absolute address $T_S$ as its recording start position is recorded in a similar fashion to (a) in FIG. 3, when a recording operation for the new information 30 is instructed by the user through the display and operation section 28, the microcomputer 24 refers to additional information being stored in the TOC buffer memory 15. By this process, it is recognized that the second information 32 has already been recorded in the recording start position where the new information 30 is instructed to be recorded. Thus, a is given to show that the position has already been occupied by the warning device according to the instruction from the microcomputer 24. More specifically, for example, since the recording start position of the new information 30 is included within the recording range of the second information 32, when the new information 30 is recorded with $T_s$ as its recording start position, the warning is given to show that the second information 32 is partially erased, and that the third information 33 is also erased since it exists just behind the second information 32.

According to the warning, the user decides whether or not to record the new information 30 with $T_s$ as its recording start position, and if he judges that the second information 32 and the third information 33 should remain, he specifies another position on which to record the new information 30. In that case, the absolute addresses indicating the recording start position and recording end position and the like of the new information 30 are recorded in the TOC area 1a.

On the other hand, if the user judges that the second information 32 and the third information 33 may be erased, he may instruct the system to record the new information 30 with $T_s$ as its recording start position. In that case, the second information 32 and the third information 33 are partially erased by the overwriting the new information 30 in the area 1b.

When the new information 30 is recorded in the range $T_s$ to $T_E$ at first, the absolute addresses $T_s$ and $T_E$ indicating the recording start position and recording end position of the new information 30 are recorded in the TOC area 1a. Then, using the microcomputer 24 as a second editing device, it is judged whether each remaining amount of the second information 32 and third information 33, which are partially left over, is not less than a predetermined value. For example, in the case of music information, the question is whether the information is not less than one minute when it is converted into performance time. In addition, the predetermined value may be preset by the user.

Hereupon, in the condition shown by (b) in FIG. 3, it is assumed that each of the second information 32 and third information 33 partially remains with a length not less than the predetermined value. In that case, the microcomputer 24 decides whether the additional information with respect to the second information 32 and third information 33 should be continuously kept in the TOC area 1a. With that decision, the microcomputer 24 causes the system to rewrite the additional information in the TOC area 1a, changes the absolute address indicating the recording end position of the second information 32 from the previous $T_3$ to $T_s$, and changes the absolute address indicating the recording start position of the third information 33 from the previous $T_3$ to $T_E$.

Next, when accessing the information recording area 1b shown by (c) in FIG. 3, it is assumed that a recording operation for the new information 30 with $T_s$ as its recording start position is instructed. Then, it is assumed that, in spite of the warning to show that the position has already been occupied, the new information 30 is recorded with $T_s$ as its recording start position.

In that case, the absolute addresses indicating the recording start position and recording end position of the new information 30 are first recorded in the TOC area 1a. Next, by using the microcomputer 24 as the first editing device, it is judged whether the third information 33' has been completely erased, and then the additional information with respect to the third information 33' is erased from the TOC area 1a.

Furthermore, by using the microcomputer 24 as the second editing device, it is judged whether the second information 32' and the fourth information 34' are partially erased, and then it is judged whether each of the remaining amount of the second information 32' and forth information 34' is not less than the predetermined amount. When each of the remaining amount of the second information 32' and fourth information 34' is not less than the predetermined value, as aforementioned, the contents of the TOC area 1a are rewritten, and the absolute address indicating the recording end position of the second information 32' is changed from $T_3'$ to $T_s$ while the absolute address indicating the recording start position of the fourth information 34' is changed from $T_4'$ to $T_E$.

Next, as shown by (d) in FIG. 3, the following discussion concentrates on the case where the new information 30 is recorded with $T_s$ as its recording start position as was aforementioned. Again in this case, the absolute addresses indicating the recording start position and recording end position of the new information 30 are first recorded in the TOC area 1a.

Then, using the microcomputer 24 as the second editing device, it is judged whether the second information 32" and third information 33" are partially erased, and continuously judgement is made on the remaining amount of each of the second information 32" and third information 33". When the remaining amount of each of the second information 32" and third information 33" is less than a predetermined value, the microcomputer 24 judges that the remaining parts of the second information 32" and third information 33" are not important, and erases the additional information with respect to the second information 32" and third information 33" from the TOC area 1a.

In the above arrangement, description discusses the editing processing with respect to the TOC area 1a in the case where previous information is erased by overwriting operation. However, the same editing processing is also performed in the case where any information is erased by an erasing operation.

As aforementioned, in the present embodiment, the editing process with respect to additional information in the TOC area 1a is performed without any instruction from the user when previous information is completely or partially erased by the overwriting operation, erasing operation or other operation. Even if the previous information remains partially, the rewriting or erasing operation with respect to the additional information is performed according to the length of the remaining part. Therefore, the arrangement spares the user from the trouble of performing the editing operation. Conformity between the contents of the TOC area 1a and the actual recorded contents of the information recording area 1b is always maintained.

In addition, in the arrangement of the above embodiment, absolute addresses are recorded in the magneto-optical disk 1 by giving wobbling to the guiding grooves 14; however, absolute addresses may be recorded by other methods such as those using pits mechanically formed.

Moreover, in the above embodiment, the explanation was given on the magneto-optical disk as a rewritable disk; however, the present invention is also applicable to rewritable disks such as optical disks of a phase transition type, or to Direct Read After Write type disks or the like capable of recording information only once.

As aforementioned, a recording and reproducing device of the present invention includes an information recording area and a TOC area, is used for recording and reproducing on and from a rewritable recording medium having absolute addresses, and further includes: a recording device for recording information in the information recording area and for recording in the TOC area the absolute addresses indicating at least the recording position of the information as additional information each time the information is recorded in the information recording area; a display for graphically displaying the recorded ranges and unrecorded ranges of the information recording area independently according to the absolute addresses recorded in the TOC area with respect to the recording positions of each piece of information; a warning device for issuing a warning to alert a user that a designated position for recording information is already occupied by referring to the additional information recorded in the TOC area when it is instructed to record new information in the position of the information recording area where another information has already been recorded; a first editing device for erasing the additional information from the TOC area with respect to any information within the information recording area when the information is completely erased therefrom; and second editing device for detecting a remaining amount of any information when the information is partially erased within the information recording area, for recording the absolute addresses indicating the recording positions of the remaining information part in the TOC area, after replacing the absolute addresses indicating the recording positions of its original information with those indicating the recording positions of the remaining information part by judging the remaining information part as one piece of information when the remaining amount is not less than a predetermined value, and for erasing the additional information of the partially erased information from the TOC area when the remaining amount of the partially erased information is less than the predetermined value.

With the arrangement, each time information is recorded in the information recording area, its additional information, including at least the absolute addresses indicating the recording positions of the information, is recorded in the TOC area. Therefore even if additional information stored in the buffer section of the recording and reproducing device has been lost due to a power cut-off or other malfunction, the additional information corresponding to the newest recording conditions of recorded information is always stored in the TOC area. Consequently, in the recording operation thereafter, the user is able to accurately recognize the recording conditions of the information recording area, and avoid the trouble of recording new information over information already recorded.

Furthermore, since use of the information recording area is displayed on the display according to the absolute addresses recorded in the TOC area, that is, the recorded ranges and unrecorded ranges thereof are graphically displayed thereon, the user is able to recognize space domains easily and accurately in recording new information.

Moreover, since it is arranged that a warning is given when the system instructed to record new information in the information recording area where information has already been recorded, by evaluating the the information which has been recorded in the position, the user may choose to stop recording in the preoccupied position if he judges the information should be saved or, overwrite the old information therein. As a result, the system provides safeguards to avoid the inconvenience of mistakenly overwriting valuable information.

Moreover, in the case where information previously recorded in the information recording area is completely erased by an overwriting or erasing operation, since additional information within the TOC area with respect to the information is also erased by the first editing device, nonconformity between the contents of the TOC area and the actual contents of the information recording area is eliminated.

Furthermore, where information within the information recording area is partially erased by overwriting or other operation, a judgement is given by the second editing device with respect to the utility value of the partially remaining information based on the remaining amount. When the remaining part is comparatively long and is judged useful, the absolute addresses indicating the recording positions of the remaining part are replaced with the absolute addresses indicating the recording positions of its original information and then recorded in the TOC area. On the other hand, when the remaining part is short and is judged not useful, the additional addresses of the information is erased. Therefore, the arrangement spares the user from the task of individually the utility of the remaining information parts, and assuring conformity the contents of the TOC area and the recorded contents of the information recording area.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A recording and reproducing device, which records and reproduces data information on and from a rewritable recording medium having preset absolute addresses and including an information recording area for storing information entered from external devices and a table of contents area for storing content information showing locations of data information recorded in the information recording area, comprising:

recording means for recording data information in the information recording area and for recording content information, said content information including absolute addresses indicating recording positions of the data information recorded in the information recording area;

control means for analyzing the table of contents area when said recording means is instructed to record in a certain area of the information recording area to determine if said certain area is already recorded in;

warning means, in response to said control means, for signaling a warning indicating that said certain area has already been recorded upon, according to the content information recorded in the table of contents area;

first editing means for erasing associated content information in the table of contents area when data information is completely erased from within the information recording area; and second editing means for detecting an amount of data information remaining after a portion of originally recorded data information is erased from the information recording area, for recording in the table of contents area content information indicating a recording position of the remaining data information when the amount of remaining data information is not less than a predetermined value, and for erasing associated content information from the table of contents area when the amount of remaining data information is less than the predetermined value.

2. The recording and reproducing device as set forth in claim 1, wherein said recording means records content information including associated absolute addresses in the table of contents area each time data information is recorded in the information recording area.

3. The recording and reproducing device as set forth in claim 1, wherein the absolute addresses are prerecorded in the form of wobbling guiding grooves on a rewritable disk.

4. The recording and reproducing device as set forth in claim 1, wherein the absolute addresses are recorded by mechanically formed pits or grooves.

5. The recording and reproducing device as set forth in claim 1, wherein the rewritable recording medium an optical card.

6. The recording and reproducing device as set forth in claim 1, wherein the rewritable recording medium includes a magneto-optical disk on which data and content information is recorded and erased by utilizing magneto-optical effect.

7. A recording and reproducing device as set forth in claim 6, wherein the recording means includes an optical head for applying a light beam to the magneto-optical disk and an electromagnet for applying external magnetic fields to the magneto-optical disk in response to recording signals.

8. The recording and reproducing device as set forth in claim 1, wherein said rewritable recording/erasing medium includes rewritable disks on which data and content information is recorded and erased by utilizing phase transition.

9. A recording and reproducing device as set forth in claim 8, wherein the recording means includes an optical head for applying a laser beam to the disk so as to record and reproduce data and content information.

10. A recording and reproducing device as set forth in claim 1, wherein the rewritable recording medium includes Direct Read After Write type disks capable of recording information only once.

11. The recording and reproducing device as set forth in claim 1, wherein said warning means produces an audio warning.

12. The recording and reproducing device as set forth in claim 1, wherein the rewritable recording medium a magnetic tape.

13. The recording and reproducing device as set forth in claim 1, wherein said warning means includes a warning display for visually warning when said recording means is instructed to overwrite existing data information.

14. The recording and reproducing device as set forth in claim 2, wherein the rewritable recording medium includes a rewritable disk which perform recording and erasing by utilizing phase transition.

15. The recording and reproducing device as set forth in claim 14, wherein said display means includes a display section, shaped as a disk, for graphically and separately displaying recorded ranges and unrecorded ranges of the information recording area in the disk shaped display section.

16. The recording and reproducing device as set forth in claim 2, wherein the rewritable recording medium includes a Direct Read After Write type disk capable of recording information only once.

17. The recording and reproducing device as set forth in claim 16, wherein said recording/erasing means includes an optical head for applying a laser beam to the disk so as to record and data and content information.

18. The recording and reproducing device as set forth in claim 16, wherein said display means includes a display section, shaped as a disk, for graphically and separately displaying recorded ranges and unrecorded ranges of the information recording area in the disk shaped display section.

19. The recording and reproducing device as set forth in claim 2, said display means includes a display section for graphically and separately displaying recorded ranges and unrecorded ranges of the information recording area.

20. The recording and reproducing device as set forth in claim 2, wherein said warning means includes a warning display for visually warning when said recording means is instructed to overwrite existing data information.

21. A recording and reproducing device, which records and reproduces data information on and from a rewritable recording medium having preset absolute addresses and including an information recording area for storing data information entered from external devices and a table of contents area for storing content information showing locations of data information recorded in the information recording area, comprising:

recording/erasing means for recording data information in the information recording area, for recording content information, said content information including absolute addresses indicating recording positions of the data information recorded in the information recording area, and for erasing data information from the information recording area;

control means for analyzing the table of contents area when said recording/erasing means is instructed to record in a certain area of the information recording area to determine if said certain area is already recorded in;

warning means, in response to said control means, for signaling a warning indicating that said certain area has already been recorded upon, according to the content information recorded in the table of contents area;

first editing means for erasing associated content information in the table of contents area when said recording/erasing means erases data information from within the information recording area; and second editing means for detecting an amount of data information remaining after a portion of originally recorded data information is erased from the information recording area, for recording in the table of contents area content information indicating a recording position of the remaining data information when the amount of remaining data information is not less than a predetermined value, and for erasing associated content information from the table of contents area when the amount of remaining data information is less than the predetermined value.

* * * * *